B. Brunon,

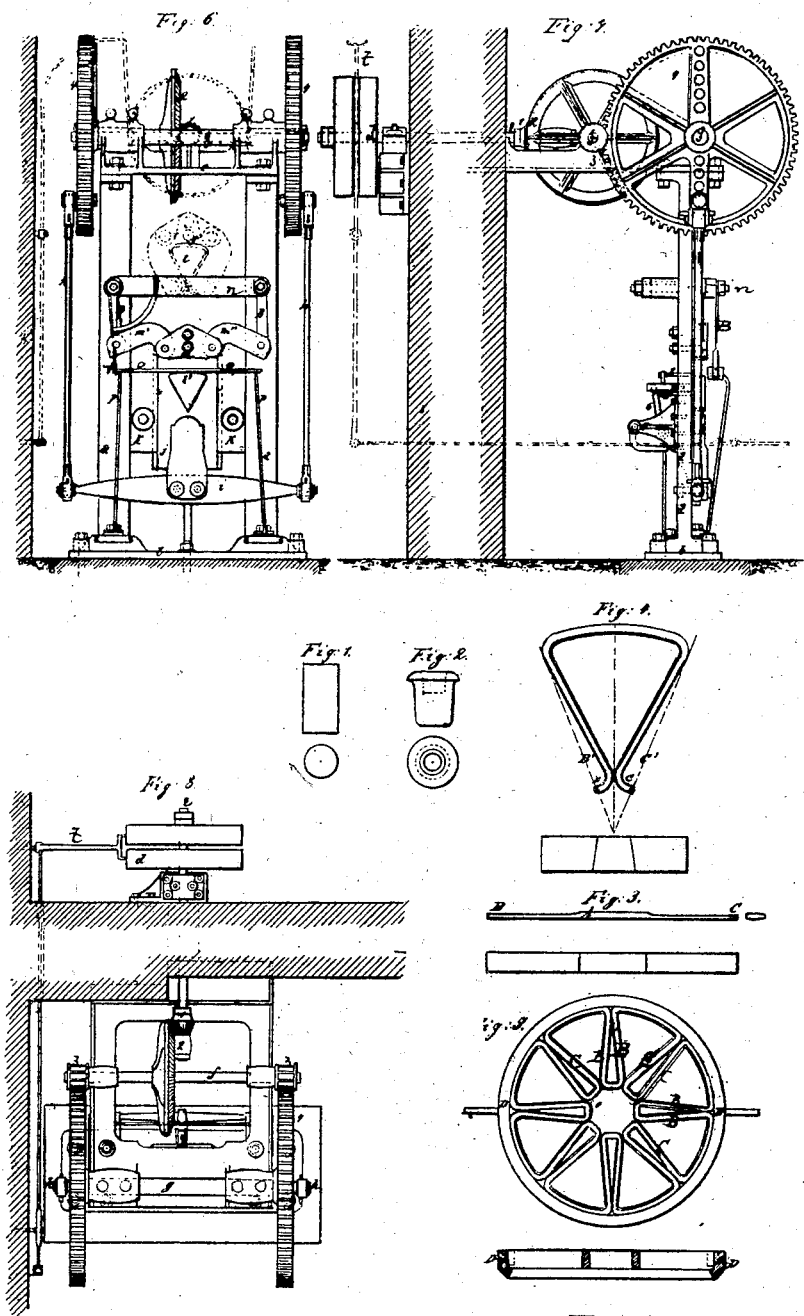

Manf. Wrought Iron Wheels.

N°. 109,380. Patented Nov. 22. 1870.

Witnesses:
1. J. Feuillat
2. E. Reiter

Inventor:
Barthelemy Brunon

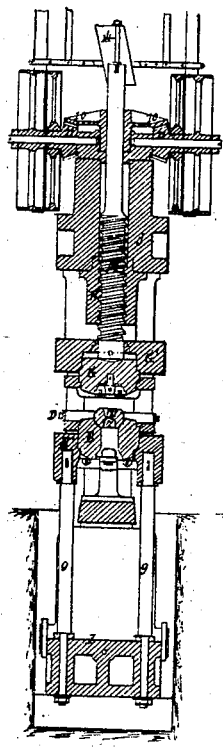
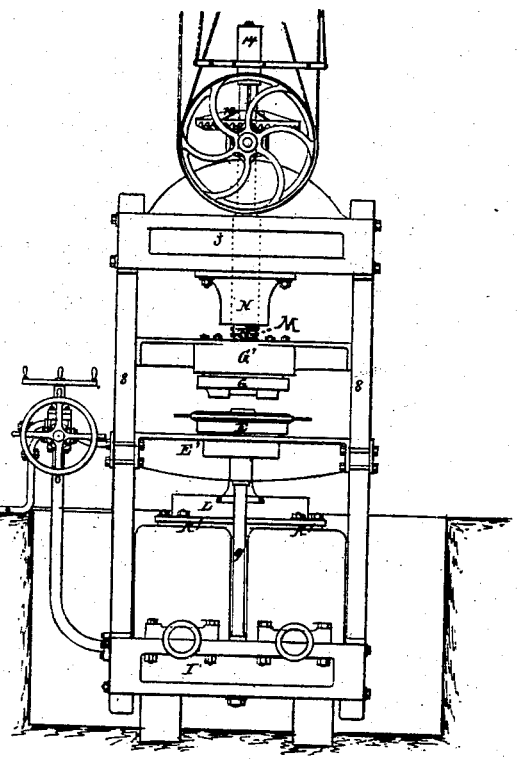
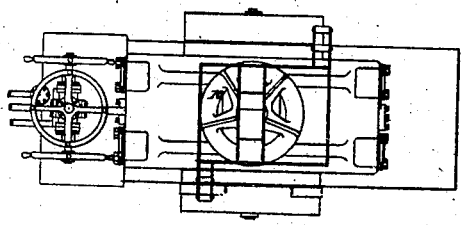

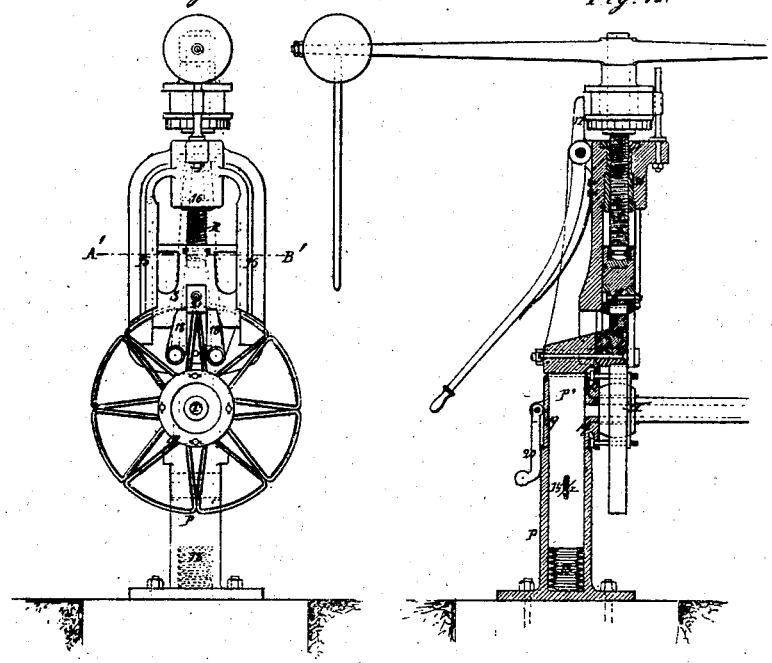

United States Patent Office.

BARTHÉLEMY BRUNON, OF LYONS, FRANCE.

Letters Patent No. 109,380, dated November 22, 1870.

IMPROVEMENT IN THE MANUFACTURE OF WROUGHT-METAL WHEELS.

The Schedule referred to in these Letters Patent and making part of the same.

*To all whom it may concern:*

Be it known that I, BARTHÉLEMY BRUNON, of Lyons, France, have invented new and useful Improvements in the Manufacture of Wrought-Metal Wheels; and I do hereby declare that the following is a full, clear, and exact description thereof, which will enable others skilled in the art to make and use the same, reference being had to the accompanying drawing forming part of this specification.

This invention relates to a new method of manufacturing metal-spoked wheels, made of iron, or such combination of iron that may be best suited for forging.

The spokes are first formed and then united to the nave at a welding heat by percussion or pressure applied at the center of a welding-block, so as to unite and impart the desired form to the parts constituting the nave by forcing the metal from the center toward the outside of the mold.

The wheel thus formed, having a suitable number and form of spokes, is as homogeneous as if made in a single piece, while the peculiar disposition of the metal, according to this improved mode of manufacture, allows the weight to be reduced to the minimum limit consistent with the strength, and thus renders the wheels applicable to all kinds of vehicles, and more especially to railway-carriages.

In carrying out my method, I use machinery for forming the several parts of a wheel, for retaining its parts in position to be united, for bringing the parts to be united to a welding heat, and for welding and uniting the parts so as to form one homogeneous whole.

Spoked metal-wheels are composed of the nave, the spokes, and the rim. An additional part consists of the metal hoop or tire forming the treading edge. The same is, however, always made apart from the wheel, and is fitted to the rim in suitable manner. Its construction or application does not constitute part of the present invention.

The rim of my wheel is divided into as many parts as there are spokes, each segment of the rim being made in one piece with two semi-spokes.

The inner ends of the spokes are united to the nave by forging.

The small intervals between the ends of contiguous rim segments are closed by forging or welding.

In this manner the welding of the spoke to the tire is dispensed with, which is a distinctive feature of my invention.

The means for carrying out my invention are illustrated in the accompanying drawing, in which—

Figure 1 represents a side and end view of the blank from which the nave is made.

Figure 2 is a side and end view of the nave.

Figure 3 is an edge, end, and side view of the blank from which the combined spoke and rim is formed.

Figure 4 is a face and end view of a section of the combined spoke and rim.

Figure 5 is a face view and section of the wheel while in process of construction within a ring, D.

Figure 6 is a front view of the machine for bending the spokes.

Figure 7 is a side view of the same.

Figure 8 is a plan or top view of the same.

Figure 14 is a side elevation of the hydraulic press for operating the matrix.

Figure 15 is a plan or top view of the same.

Figure 16 is a vertical transverse section of the same.

Figure 17 is a front elevation of the rim-welding machine.

Figure 18 is a vertical transverse section of the same.

Figure 19 is a plan or top view of the same.

Figure 20 is a horizontal section of the same taken on the plane of the line A' B', fig. 17.

Figure 21 is a horizontal section of the furnace for heating the rims of wheels.

Figure 22 is a vertical section of the same.

Similar letters of reference indicate corresponding parts.

Figure 9:
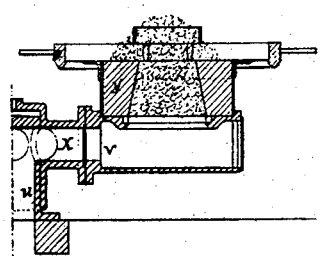
Figure 9 is a vertical section of one arm of the forging-furnace.

The nave of each wheel is formed from a cylindrical piece of metal, as shown in fig. 1, which is heated in a furnace and shaped in a matrix of suitable form.

The metal thus heated is operated upon by a punch of truncated conical shape, which forces the metal outward in the matrix, so as to give it the form shown in fig. 2, leaving also a hollow or perforated center for receiving the axle.

Figs. 3 and 4 show the metal blank from which the combined rim and spoke is formed. The same consists of a flat bar of metal of suitable length. This bar may be of a uniform section throughout its length, but preferably I vary the thickness by increasing it in the middle, so as to suit the difference of strain, as seen in fig. 3.

The center part A of the rim and spoke-blank serves to form the rim.

The spokes B C, which are or may be lenticular in section, form the ends of the rim portion.

The blank is bent in the form shown in fig. 4 in a suitable machine, and the ends of the spokes B C are cut at a bevel.

The spoke is strengthened at that part next to the nave, while the lenticular section also strengthens the center portion and facilitates the insertion and withdrawal of the shaping instrument in the subsequent operations.

The section of rim forms thus, without welding or other connection, an integral part of the spokes, and no excess of metal can be made at any part.

In order to supply the spoke-bars continuously to the bending-machine in a heated condition, and also leave a reserve constantly at disposal, I use a furnace which is arched and provided with fire-bars, so that it will supply the heat by radiation.

The furnace is provided with two bars or rails extending from side to side, to which the spoke-bars are fed through a longitudinal opening at the upper part of the furnace.

The bar, in a cold state, is laid on the projecting rail and moved transversely through the opening, and where a number of bars are introduced in succession one bar moves the other forward across the rails in the furnace until one is projected through the discharge-opening.

In this manner each red-hot bar to be supplied to the bending-machine is discharged by the introduction of a cold bar into the furnace, and a regular temperature and continuity of action are thus obtained.

The bars are set in motion by the aid of a two-armed lever, which is brought to bear on the cold bar.

The machine for bending the segmental iron spokes is shown in front view, fig. 6, side view at fig. 7, and plan at fig. 8.

It consists of a framing, $a$ $a$, standing on a bed or base, $b$, and united at top by a tie-rod, $c$, which further connects the framing to the stationary walls or standards, and forms a support for the driving mechanism.

Motion is imparted to pulley $d$, and is transmitted from its shaft $e$ to the cross-shaft $f$ by means of bevel-gearing 1 2, and thence to the principal shaft $g$, by means of spur-gearing 3 4.

The wheels 4, on either end of shaft $g$, are provided with crank-pins, which are, by rods $h$ $h$, connected with a cross-head, $i$, projecting from a slide, $j$, that moves in vertical guides $k$ $k$.

Each revolution of the shaft $g$ produces reciprocating motion of the slide $j$, the extent of such motion being regulated by the distance of the crank-pins from the center of wheel 4.

The slide $j$ carries the die $l$ for curving the rim-spoke.

The jointed counter-die $m$ is attached to a cross-bar, $n$, fixed to the framing.

The rim-spoke blank, fig. 3, is shaped by these two dies in the following manner:

The blank $o$ is first placed on the die $l$, with its ends resting on the two supports $p$ $p$, a central position being insured by the aid of regulating-guide $r$.

The rising movement of the movable die $l$ brings up the blank to the counter-die $m$, the bar $o$ being at the center held between the two.

By this continued motion of the die $l$, the jointed arms $m'$ $m''$ are swung around the die $l$ in such manner as to assume the position shown by dotted lines in fig. 6, bending the blank to the form shown in fig. 4.

Friction-rollers at the ends of the arms $m'$ $m''$ serve to guide the bar during the bending operation.

The downward motion of the die $l$ returns the matrices to their former position.

The rim-spoke, embracing the die $l$ and resting on the part $i$, is then renewed, for similarly acting on a fresh bar, by means of a lever, 6, coming in contact with a fixed stop, 7, which moves the lever forward, and with it the pusher $s$ $s$, fig. 7, attached thereto.

The lever 6 also comes in contact with stop 7 during the ascending motion for returning the pusher S to position.

The machine thus arranged transforms the straight blanks into spokes, with segments of the rim attached, the form of the spokes being varied by the use of different dies, and by regulating the strokes of the connecting-rods.

The machine is started or stopped by the belt-shipper $t$.

The rim-spoke is now of the form shown in fig. 4, with the ends B C at an angle, as indicated by the dotted lines B' C'.

A number of them is now placed into a ring, D, in the position which they are to occupy in forming the wheel, as in fig. 5.

The diameter of this ring D is such as to embrace the circle formed by the union of the rim segments.

Provision is also made for the reception of all the radial spokes.

The rim is provided with handles for moving the same.

The rim-spokes are placed in the ring, so that the ends B C may face alternately in opposite directions, this result being obtained by reversing each rim-spoke with regard to the other. This is important, in order to insure a perfect union of the parts.

The ends of the spokes are cut inclined in reverse order, so as to give some lateral support to the abutting portions.

In order to unite the nave with the spokes by forging, I first bring the parts to be united to a welding-heat.

The nave is heated by ordinary means, but I employ a special arrangement of forge for heating the inner ends of the spokes, so that only those parts are heated which require welding, and not the outer parts on the ring D.

Figure 12:
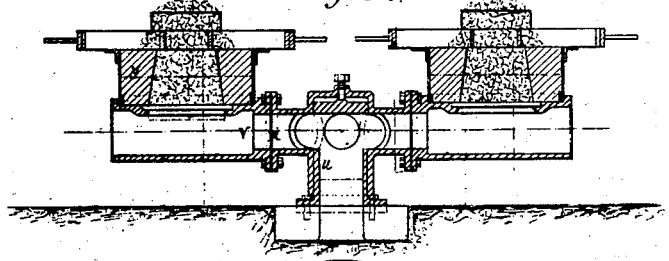
Figure 12 is a vertical section of the forging-furnace.
Figure 13:
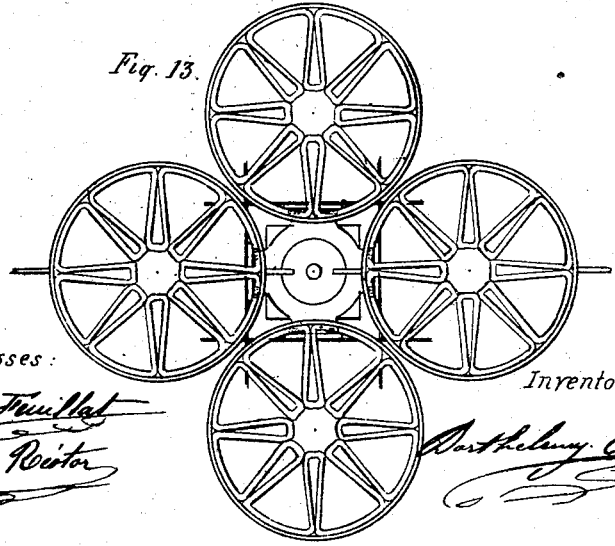
Figure 13 is a plan or top view of the same.

An arrangement of furnace for effecting the above object is illustrated in figs. 9, 12, and 13.

Around a central vertical hollow box, $u$, communicating with the blower, is radially disposed a suitable number of horizontal hollow cases, V V, receiving a supply of air from $u$ by pipes X, which may be provided with valves, if desired.

The outer ends of the cases V are open at the top, where each receives a furnace, $y$, of refractory material, and provided with fire-bars, if desired.

This circular furnace is intended to receive the wheel whose center is to be heated.

The wheel is placed in position by the aid of the aforesaid ring D, which is of larger diameter than the furnace, and is thus not subjected to its action.

The air for combustion supplied from the case V permeates both the lower and the upper layers of fuel, which envelopes the center of the wheel, and regulates the temperature.

By employing a number of these radiating furnaces on one box, $u$, a continuity of action is insured.

Figure 10:
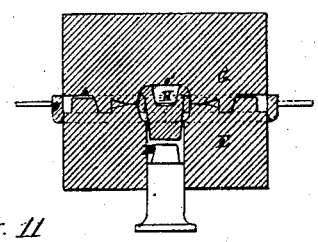
Figure 10 is a vertical central section of the matrix for uniting spokes and naves.
Figure 11:
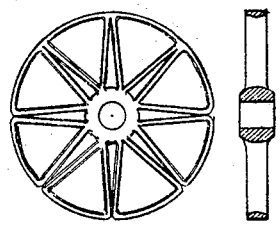
Figure 11 is a face view and section of wheel as brought out of said matrix.

The matrix for uniting the nave to the spokes, shown in fig. 10, is made in two parts, upper and lower, E G, whose horizontal surfaces are caused to meet in the spaces between the spokes of the wheel.

The diameter of each matrix corresponds to the internal diameter of the ring D.

The part E is hollowed at its center, for receiving the forging-punch or cone H.

Figs. 14, 15, and 16, show an arrangement of hydraulic press or machine for operating the matrices E G and punch H, which parts are employed for uniting the spokes to the nave by welding, and also for stamping or molding the heated portion of the metal.

Fig. 14 shows a front view;

Fig. 15, a plan; and

Fig. 16, a longitudinal vertical section of the molding-machine.

It is composed of a base, I, and head, J, which are supported on columns 8 8, that form the framing of a hydraulic press, having two pistons, K' K', united by a cross-head, L.

To the latter is attached the punch H.

The fixed die E is on an intermediate cross-bar, E', which is firmly connected to the framing 8 8 and tie-rods g, while the movable matrix or die G is secured to a cross-bar G', which is capable of vertical adjustment under the action of a screw, M, working in a nut, N, by means of a double set of bevel-gearing 10 10 11 11, which is actuated by suitable motive power.

The motion may be readily reversed or arrested by hand automatically by the aid of a double inclined plate, 14, which moves up and down with the screw M.

The action of the machine is as follows:

The dies E G are first separated, and the several segments of the rims and spokes in a heated state, (all scoria being removed,) together with the unformed nave also in a heated condition, and placed in the center, are, by the aid of the ring D, placed in the spaces corresponding therewith into the die E.

The screw M is then set in motion for lowering the die G until it is brought in contact with E, at which moment the hydraulic press is put in action to force up the conical punch H from below the nave, and effect a lodgment therein, by which means the heated metal is caused to fill all the spaces, and takes the form of the mold, which remains stationary.

A counter-punch, o', carried by the upper matrix G, serves to afford the necessary resistance to the upward pressure.

After the compression, the dies are separated, when the spokes will be found to be homogeneously welded with the nave to the form of the dies.

The metal in excess forms a transverse partition, 12, of greater or lesser thickness, in the bore of the nave, which partition is afterward removed.

I will now describe the machine for forging or welding together the several segments of the rim.

This operation is effected either by pressure or percussion applied at the ends of the spokes without bearing on the same, so as not to disarrange the parts, and serves to weld the filling-wedges that are inserted at the point where the spokes join the rim, and it also prevents the bulging of the spokes and the separation of the segments, thus preserving the form imparted to the wheel by the first operations.

The rim-forging machine consists of a framing, P P', formed in two parts, P being a hollow column firmly supported on a base, and in which is received the part P', turned at its lower end, and sliding with slight friction in P.

The part P' is supported on springs 13 13, and is prevented from turning by a key, 14½, as shown.

To the upper end of part P' is secured a yoke-shaped frame, 15, terminating in a screw-socket, 16, in which a screw, R, carrying the hammer-head S, can be moved up or down.

The screw R is operated by a spring-balance lever, and is also provided with a brake-lever, 17.

The counterpart of the hammer is formed by two jointed jaws, 18 18, attached to the framing, and when the pressure or percussion is applied, these jaws, which are embraced at their ends by the part S, tend to approach each other and gripe the spokes, so as to form a firm support for sustaining the forging or welding operation without in the least effecting the symmetry of the wheel.

T is an arbor projecting from a socket, 19, being secured in a tubular case or arm that is formed at right angles on said socket.

The socket embraces the upper part P' of the framing, on which it is free to turn, and rests on the lower part P, in which position it is fixed by a hand-lever, 20, fitting into a notched portion of the hollow column.

The wheel to be welded being heated at the point of junction of the spokes and rim, is then suspended from the arbor T by the nave, a counterpart or washer, 21, engaging in a helical groove that is made in the arm, so as to bring the heated part under the action of the hammer or pressing tool, that is to say, between the jaws 18 18.

The welding-wedge is then placed at the ends of the heated bars, on which pressure is applied, or the blow struck by the end of the balance-lever.

The wedge is held between the cutting-edges of the percussion instrument, and embraces the sides of the rim, it being cut off at the desired length during the downward motion.

This operation requires to be repeated for each section of the rim.

The wedges are heated in any suitable manner.

I employ the arrangement of rotary forge herein described for heating the several points in the periphery of the wheel.

This rotary forge, shown in figs. 21 and 22, is made to rotate on an axis, V, and supported on a solid foundation, having a hollow center, 22, at which the air for combustion is supplied.

The rotating axis V unites the four radiating forges, and supplies air thereto.

X X are supports for the wheels corresponding in height with the arm T before referred to.

The axis V is, by radial branches 23, connected with the several furnaces Y Y that are under the wheel-supports X X respectively.

The furnace receives air from the axis V through the channels 23, each of which is provided with a valve, 24.

It will be readily understood that if the furnaces are lighted, and a wheel suspended from each arm X, four wheels may be heated simultaneously, while the position of the four furnaces may be varied by turning them on their axes, without interrupting their action.

The arms X of the forge correspond, as before mentioned, in height with the arm T of the last-mentioned wedging-machine, and, as the arms X rotate on the axes V, they may be successively brought in line with and against the arm T, so that a wheel may be readily transferred from an arm X to the arm T for receiving a wedge, after which it is returned to X, to be again heated at another place, for receiving another wedge.

The second arm X then comes into action by the partial rotation of the forge, and so on.

In the above manner I am enabled to weld the rims in a continuous manner.

The wheel is not heated after the last wedge has been applied, but is replaced on the arm X by another, while the finished wheel is removed from the arm T of the wedging-machine.

The screw 25 serves to regulate the height of the arms of the forge, so as to bring them in relation with the wedging-machine.

The herein-described mode of manufacturing forged spoke-wheels is also wholly or in part applicable to all kinds of metallic wheels other than before described.

Having thus described my invention,

I claim as new and desire to secure by Letters Patent—

The method herein described of constructing metal-spoked wheels, substantially as set forth.

BARTHÉLEMY BRUNON.

Witnesses:
T. FEUILLAI,
E. RÉOTOR